United States Patent [19]

Goetz et al.

[11] Patent Number: 5,401,349
[45] Date of Patent: Mar. 28, 1995

[54] PRODUCTION OF SHAPED ARTICLES

[75] Inventors: Walter Goetz, Ludwigshafen; Hans-Peter Weiss, Mutterstadt, both of Germany

[73] Assignee: BASF Aktiengesellschaft, Ludwigshafen, Germany

[21] Appl. No.: 207,264

[22] Filed: Mar. 8, 1994

Related U.S. Application Data

[63] Continuation of Ser. No. 18,523, Feb. 17, 1993, abandoned.

[30] Foreign Application Priority Data

Feb. 17, 1992 [DE] Germany ............... 42 04 685.8

[51] Int. Cl.$^6$ ............................... B32B 31/00
[52] U.S. Cl. ............................ 156/286; 156/289
[58] Field of Search ........................ 156/286, 289

[56] References Cited

U.S. PATENT DOCUMENTS

| | | |
|---|---|---|
| 3,673,048 | 6/1972 | Gidge et al. . |
| 4,141,863 | 2/1979 | Coran et al. . |
| 4,167,614 | 9/1979 | Ciferri et al. . |
| 4,458,391 | 7/1984 | Scarpini . |
| 4,560,614 | 12/1985 | Park . |
| 4,612,221 | 9/1986 | Biel et al. . |
| 4,767,220 | 8/1988 | Kamp . |
| 4,978,408 | 12/1990 | Burford et al. . |
| 4,978,484 | 12/1990 | Takashige et al. . |
| 5,026,763 | 6/1991 | Lohrbaecher . |
| 5,043,041 | 8/1991 | Sipos et al. ............... 156/247 |
| 5,075,168 | 12/1991 | Maruyama et al. . |
| 5,126,211 | 6/1992 | Mizutani et al. . |
| 5,126,401 | 6/1992 | Chou . |
| 5,129,813 | 7/1992 | Shepherd ............... 156/286 |
| 5,153,066 | 10/1992 | Tanaka et al. . |
| 5,202,178 | 4/1993 | Turner . |

FOREIGN PATENT DOCUMENTS

| | | |
|---|---|---|
| 34757 | 5/1985 | European Pat. Off. . |
| 540135 | 10/1941 | United Kingdom . |
| 2124130 | 2/1984 | United Kingdom . |

OTHER PUBLICATIONS

"Polyamides," Encyclopedia of Polymer Science and Engineering, revised edition, vol. 11, pp. 347–348, New York:John Wiley & Sons, 1987.

Pflüger, R., "Physical Constants of Various Polyamides" in *Polymer Handbook*, 3rd ed., John Wiley & Sons, 1989, pp. V109, V113, V115 (Brandrup, J., and Immergat, E. H., editors).

S. J. Allen, J. Text. Inst., 44, 286(1953), pp. 1, 286, 297, 298, 304.

*Primary Examiner*—Chester T. Barry
*Attorney, Agent, or Firm*—Keil & Weinkauf

[57] ABSTRACT

In a process for producing shaped articles by curing prepregs from fiber reinforced laminating resins by the autoclave method of vacuum bagging, the prepreg laminates are covered with a film of nylon 66 having a caprolactam content of from 3 to 30% by weight.

3 Claims, No Drawings

PRODUCTION OF SHAPED ARTICLES

This application is a continuation of application Ser. No. 08/018,523, filed on Feb. 17, 1993, now abandoned.

The present invention relates to a process for producing shaped articles by curing prepreg laminates from fiber reinforced laminating resins by the autoclave method of vacuum bagging using specific cover films.

Prepregs from fiber reinforced laminating resins are customarily cured to fiber composites by the autoclave method of vacuum bagging. For this the prepreg laminate is laid wrapped in release film onto a support surface and covered with a gas impermeable polyamide film, the space between the support surface and the cover film is evacuated to remove air pockets, and the entire assembly is subjected in an autoclave to elevated temperature and pressure to cure the laminating resin.

The cover films used are usually those made of nylon 6 or nylon 66. Nylon 6, having a comparatively low-softening temperature, can be used only with those laminating resins whose curing temperature is below 200° C. Owing to the presence of volatile constituents which evaporate from nylon 6 films at the high curing temperatures and in the course of the long curing times, the inner surface of the autoclave gets covered with a deposit which necessitates frequent cleaning.

Films made of nylon 66 have the disadvantage that they are not very flexible, so that the edges of the prepreg laminate become rounded and, if cover plates are laid on top, can even break.

It is an object of the present invention to avoid the disadvantages described.

We have found that this object is achieved by using cover films composed of a copolyamide containing from 70 to 97% by weight of nylon 66 units and from 30 to 3% by weight of nylon 6 units.

Copolyamides 66/6 are known per so. They are prepared by conjoint polycondensation of adipic acid, hexamethylenediamine and caprolactam. The copolyamides used according to the invention contain from 3 to 30, preferably from 5 to 20, in particular from 8 to 15%, by weight of caprolactam units. They can be heat stabilized with customary Cu(I) compounds, preferably Cu(I)/KI complexes, in which case the Cu content is preferably from 30 to 1000 ppm. Films can be produced from this copolyamide in a conventional manner, for example by extrusion from a slot die onto a chill roll as described in EP-B-34 757. The film thickness is preferably 25–300, in particular 40–100, μm. The film can contain the customary processing aids.

The process of the invention is suitable for curing prepregs formed from customary fiber reinforced laminating resins, for example those based on epoxy resins, bismaleimide resins, vinyl ester resins or unsaturated polyester resins. The resins contain the respective customary hardeners and also reinforcing fibers, preferably in amounts of 30–80% by weight, preference being given to the use of continuous filament fibers oriented in the prepreg in one or more preferred directions. The prepregs may also contain customary additives, such as thermoplastics, rubbers, pigments or flame retarders.

To produce the fiber composites, a plurality of layers of prepregs, in general from 4 to 10 layers, are draped on top of one another to form a laminate in which the reinforcing fibers can be oriented in different directions. The laminate thickness is usually from 0.3 to 10 cm.

The laminate is enclosed on both sides by release films which are to facilitate removal of the cured fiber composite. Suitable for this purpose are for example Teflon films. The prepreg laminate is then laid onto a support surface, advantageously a metal plate. In some cases it is advantageous, if uniformly thick articles are to be produced, to place a further plate, preferably made of metal, on top of the laminate. This can be followed by a gas permeable glass fiber mat. Finally, the polyamide film of the invention is applied to effect a gastight seal.

The space between the support surface and the cover film is evacuated to remove air pockets and thereby prevent voids in the shaped article. In most cases it is sufficient to reduce the pressure to less than 100 mbar, preferably to less than 50 mbar. For this the entire assembly is exposed to elevated pressure in an autoclave. The most suitable curing temperature varies from resin to resin, but is in general within the range from 120° to 250° C., preferably within the range from 150° to 220° C.; the time is within the range from 2 to 5 hours. After the curing has ended, the assembly is removed from the autoclave and the release films are peeled off the cured article.

EXAMPLES

Polyamides used

A. Copolyamide 66/6 with 10% by weight of caprolactam, Ultramid ® KR 4603 from BASF AG (according to the invention)

B. Nylon 6, Ultramid B4

C. Nylon 66, Ultramid A4

D. Copolyamide 66/6 with 50% by weight of caprolactam, Ultramid 5A

Film production

A DEMAG flat film unit comprising a 90 mm extruder (L:D=25), a slot die and cooling and heating metal rolls was used. The melt temperature was 275° C., the melt pressure 180 bar and the screw speed 50 min$^{-1}$. The cooling roll temperature was 95° C. The slot die used was of the Flexlip type, 800 nun in length and 0.5 mm in width.

This apparatus was used to convert the specified polyamides into flat films 680 mm in width and 50 μm in thickness at a hauloff rate of 40 m/min.

The films obtained were subjected to thermo-gravimetric analysis (TGA) to determine the volatiles content as weight loss in % at 200° C./20 l/h air/1 h.

Prepreg making

X. The epoxy resin Rigidite ® 5208 from BASF (epoxy Araldite MY 720 from CIBA-GEIGY with diaminodiphenyl sulfone as hardener) was used to machine coat a release paper with a resin film which was processed on a prepreg machine by the resin film transfer technique together with parallelized glass fiber rovings into a unidirectional prepreg. The glass content was 60% by weight.

Y. The same techniques were used to produce a prepreg from the bismaleimide resin Rigidite 5250 (bismaleimide with diallyl-bisphenol A as hardener) and unidirectional glass fibers.

Prepreg curing

An experimental mold was used to fabricate rectangular pans having the dimensions 300×200×40 mm (side wall slope 70°) and a wall thickness of 2.5 mm. In each case 30 prepregs X or Y were draped on top of one another to form laminates, wrapped in Teflon release films, placed on an aluminum sheet, covered with films A to D and evacuated (<50 mbar).

Curing took place in an autoclave at 180° C. (epoxy resin) or 225° C. (BMI resin). The pressure was 10 bar $N_2$ and the curing time was 2 hours.

The surface (edges) of the articles obtained was visually assessed.

| Ex. | Prepreg | Film | RESULTS TGA loss | Visual assessment |
|---|---|---|---|---|
| 1 | X | A | 0.7% | no blemish |
| 2 | X | B | 3.0% | no blemish |
| 3 | X | C | 0.5% | rounded edges |
| 4 | X | D | 4.0% | no blemish |
| 5 | Y | A | 0.7% | no blemish |
| 6 | Y | B | 3.0% | softened film |
| 7 | Y | C | 0.5% | rounded edges |
| 8 | Y | D | 4.0% | no blemish |

Examples 1 and 5 are according to the invention.

We claim:

1. A process for producing shaped articles by thermal curing of prepregs made from fiber reinforced laminating resins comprising laying prepreg laminates enclosed on both sides by release films onto a support surface, covering said laminates with a gas impermeable film, evacuating the space between the support surface and the cover film and exposing the assembly to an elevated temperature in an autoclave, wherein the polyamide film comprises a copolyamide containing from 85 to 92% by weight of nylon 66 units and from 8 to 15% by weight of nylon 6 units.

2. A process as in claim 1 wherein the copolyamide contains a copper (I) stabilizer.

3. A process as in claim 2 wherein said stabilizer is a Cu(I)/KI complex having a Cu content of from 30 to 1000 ppm.

* * * * *